Jan. 5, 1965     B. DENMARK     3,163,866
DECORATED BATHING CAP

Filed Nov. 22, 1961     2 Sheets-Sheet 1

Jan. 5, 1965 B. DENMARK 3,163,866
DECORATED BATHING CAP

Filed Nov. 22, 1961 2 Sheets-Sheet 2

United States Patent Office 3,163,866
Patented Jan. 5, 1965

3,163,866
DECORATED BATHING CAP
Bernhart Denmark, Port Chester, N.Y., assignor to International Latex Corporation, Dover, Del., a corporation of Delaware
Filed Nov. 22, 1961, Ser. No. 154,130
1 Claim. (Cl. 2—68)

This invention is a decorated bathing cap.

The recent advent of decorative pieces, such as flowers, made of polyethylene has created a demand for items carrying such decorative pieces. This demand has been stimulated by the fact that the polyethylene plastic can be made to reproduce natural flowers and vegetation in their exact shape and color. The plastic reproduction is so true to life that the difference between a natural flower and a plastic flower is evident only when the plastic flower is touched, when the characteristic slightly slippery feeling of the polyethylene plastic becomes noticeable.

The use of these polyethylene flowers on articles made of rubber, such as bath caps, has however produced problems of its own. Decorative flowers or other ornaments made of rubber generally have been secured to rubber bathing caps by means of rubber cement, but rubber cement cannot be made to secure polyethylene flowers to rubber caps since the polyethylene plastic is not bonded by rubber cement, and all rubber cements of which the inventor is aware share this common disability. Rivets have not been found satisfactory, particularly for bulky flowers because accurate placement of the rivets is often difficult due to stretching of the rubber material of the cap. Various other expedients, including snap fasteners, have been tried but found wanting for various reasons.

The present inventor has unexpectedly found that polyethylene flowers can be securely attached to waterproof rubber bathing caps by snap fasteners having certain characteristics and placed in certain positions on the polyethylene flower and rubber cap. By this invention even large bulky decorations made of polyethylene may be securely attached to rubber bathing caps and will not become detached even when subjected to the disengaging forces generated in diving. For the purposes of this invention the term "frond" is generic to leaves, petals, sepals and other flower portions.

The advantages of the present invention are achieved by the construction of the type shown in the drawings which illustrate preferred embodiments of the invention, it being understood that such embodiments are shown by way of illustration only. In the drawings.

Figure 1:
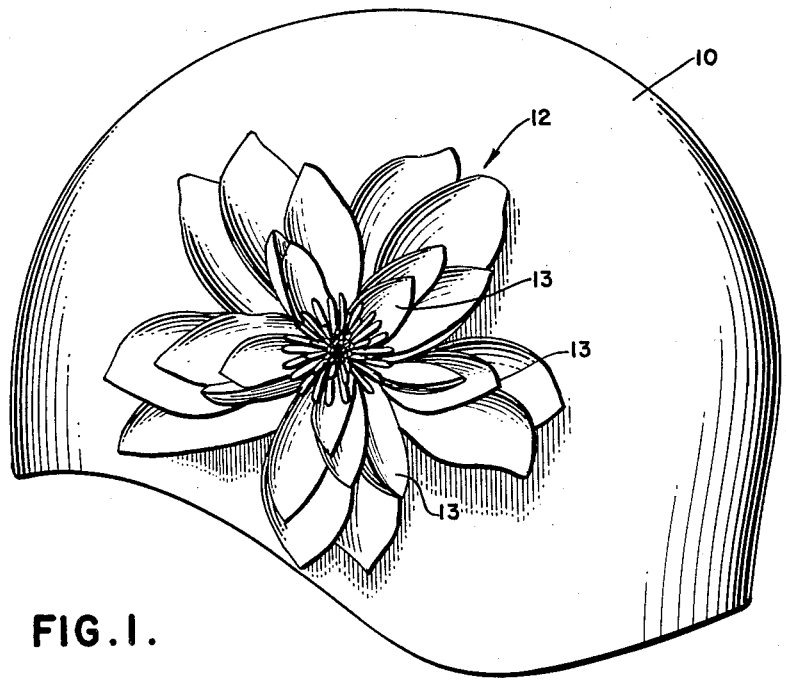
FIG. 1 is a plan view of a bathing cap with attached decorative piece.
Figure 2:
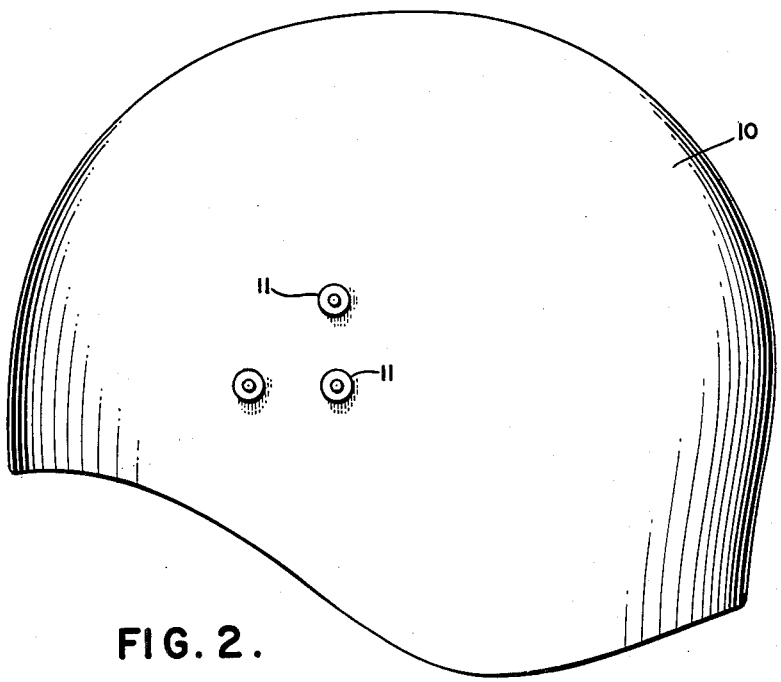
FIG. 2 is a plan view of the bathing cap alone showing the arrangement of the fastening elements.
Figure 4:
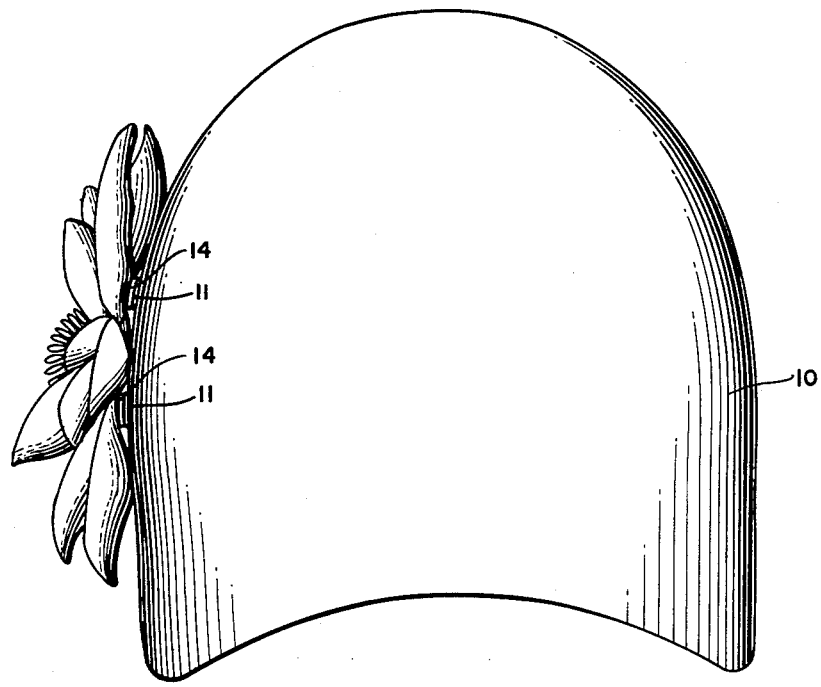
FIG. 4 is a side elevational view looking from the rear showing the bulk of the decorative piece and two fastening elements.
Figure 3:
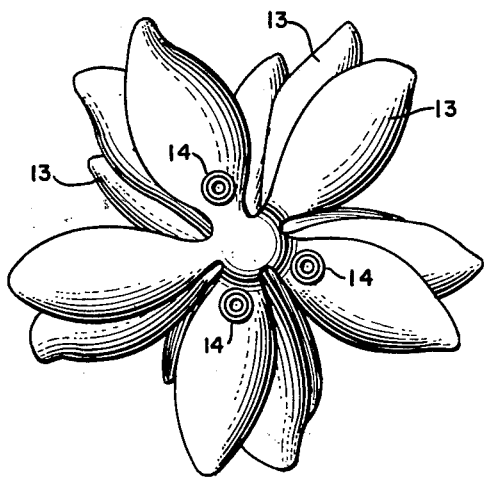
FIG. 3 is a plan view of the bottom side of the decorative piece showing the arrangement of the complementary fastening elements.
Figure 5:
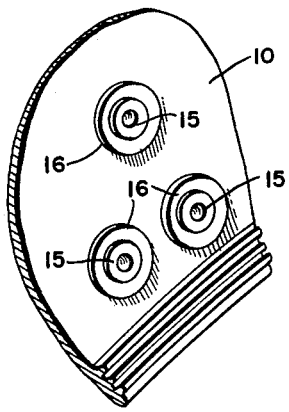
FIG. 5 is a partly sectional view showing the inside of the cap with reinforced fastening elements.

Referring now to the drawings, bathing cap 10 has a plurality of male fastening elements 11 preferably arranged in the form of a triangle the sides of which are one to two inches in length. Decorative piece 12 in the form of a flower has fronds 13 which overlap each other, the short fronds being on the top and the longer fronds on the bottom. FIG. 4 shows the bulk of the flower extending out from the bathing cap with two fastening elements being visible. Decorative flower 12 has female fastening elements 14 which are positioned on the bottommost fronds of the flower and in positions corresponding to the complementary fastening elements 11 on the cap. As shown in FIG. 1, the fastening elements on the flower as well as the cap are completely hidden by overlying fronds which extend out over the fastener elements, and the flower appears to be integrally attached to the bathing cap.

The inventor has found that satisfactory fastening elements must successfully resist a disengaging force of at least five pounds pull in order to maintain the flower intact upon the cap. Without such holding power the forces created when the wearer of the cap dives into the water disengage the flower and cause it to be lost. In this connection it is noted that the apex of the triangle formed by the fastener elements is toward the top, with the base of the triangle at the bottom. All the fasteners are closer to the center of the flower than the outer ends of the overlying fronds. It is also advantageous to reinforce the fastening elements 11 in the bathing cap so they will not pull out and rip the cap. The reinforcement may be done in a variety of ways but a very satisfactory method is to secure a sheet of fabric 16 on the under surface of the bathing cap and then secure the fastening element 15 through the reinforced area. An additional advantage stems from the fact that the polyethylene, being non-wetting and hydrophobic, reduces the amount of dripping into the eyes and face of the wearer.

While I have herein shown and described a preferred embodiment of my invention, it is nevertheless to be understood that various changes may be made therein, without departing from the spirit and scope of the appended claim.

I claim:

A decorated bathing cap comprising a waterproof rubber head covering cap member and a polyethylene decoration member, said decoration member extending out from the cap member and being detachably secured to same by three male-female type fasteners, the fasteners being arranged in the form of a triangle having its apex towards the top thereof and having sides of the order of one to two inches, the spacing of the fastener members of the decoration member corresponding to the spacing of the fastener members mounted in the cap, and being overlain by frond members of said decoration so as to cover said fasteners when the decoration is positioned on said cap, each of said fastener members of the cap being secured to the undersurface thereof through individual reinforcing fabrics.

References Cited in the file of this patent

UNITED STATES PATENTS

| | | |
|---|---|---|
| 1,139,418 | Hiller | May 11, 1915 |
| 1,368,864 | Turner | Feb. 15, 1921 |
| 1,491,258 | Gluckin | Apr. 22, 1924 |
| 2,282,220 | Gage | May 5, 1942 |
| 2,520,049 | Moore | Aug. 22, 1950 |
| 2,908,942 | Bosco | Oct. 20, 1959 |

FOREIGN PATENTS

| | | |
|---|---|---|
| 8,899 | Great Britain | Nov. 9, 1905 |